O. H. DUCKWORTH.
RESILIENT TIRE.
APPLICATION FILED AUG. 21, 1911.
1,030,984.
Patented July 2, 1912.
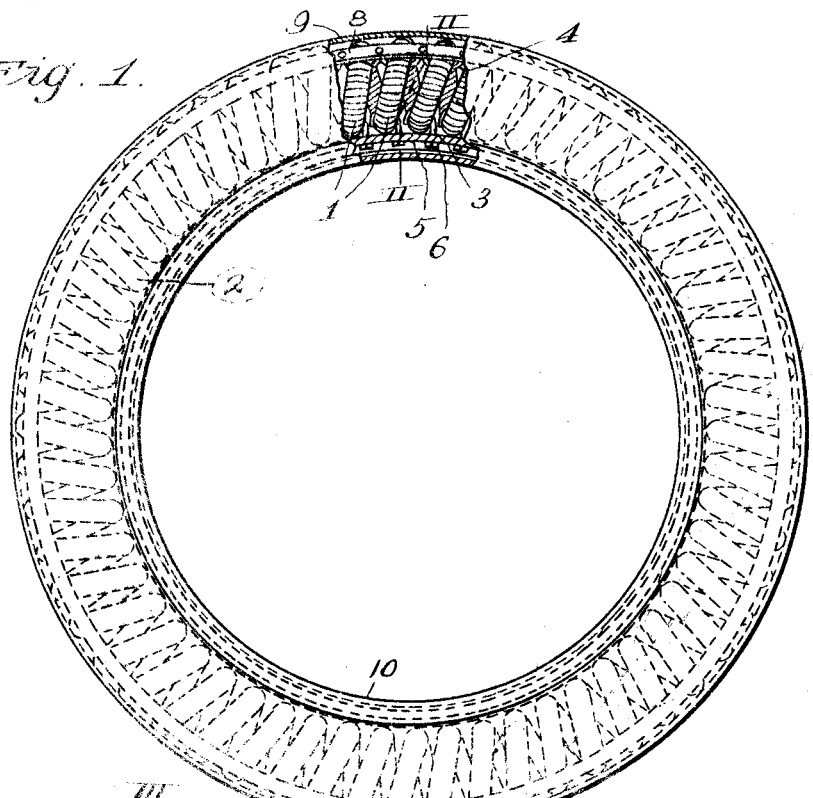
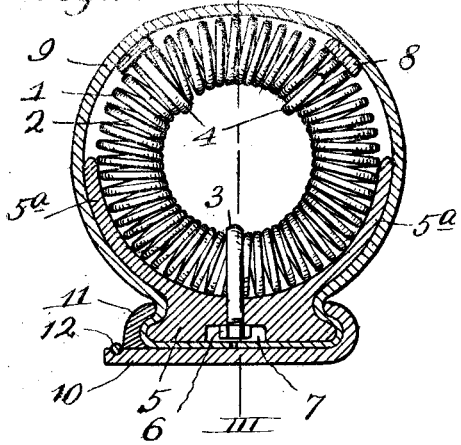
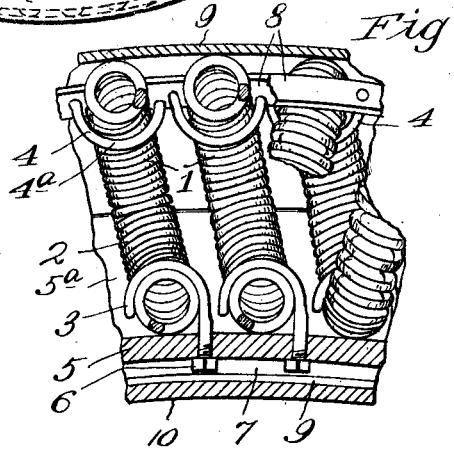
Witnesses:
Inventor,
Oscar H. Duckworth,
By F. G. Fischer,
Atty.

UNITED STATES PATENT OFFICE.

OSCAR H. DUCKWORTH, OF SUMMERFIELD, KANSAS.

RESILIENT TIRE.

1,030,984.

Specification of Letters Patent.

Patented July 2, 1912.

Application filed August 21, 1911. Serial No. 645,091.

*To all whom it may concern:*

Be it known that I, OSCAR H. DUCKWORTH, a citizen of the United States, residing at Summerfield, in the county of Marshall and State of Kansas, have invented certain new and useful Improvements in Resilient Tires, of which the following is a specification.

My invention relates to improvements in resilient tires, and my object is to provide a new and useful device of this character which is adapted for use on automobile, bicycle, and other vehicle wheels where a device of this character is desired.

A further object is to provide a tire possessing all of the advantages of a pneumatic tire, without being subject to danger from puncture, and one which is durable, easily repaired, and can be manufactured at comparatively small cost.

Other objects of the invention will hereinafter appear, and in order that said invention may be fully understood reference will now be made to the accompanying drawing, in which:

Figure 1 is a side elevation of my improved tire, a portion of the casing being broken away. Fig. 2 is an enlarged cross section on line II—II of Fig. 1, and Fig. 3 is a vertical section on line III—III of Fig. 2.

In carrying out the invention I employ a coil-spring, preferably, of the closed cylinder type, which is wound around in a series of convolutions 1, to form a coil tire spring 2, free to yield at any point. Each convolution 1, is held in proper relation to its companion by an L-shaped retaining-member 3, and a pair of hooks 4. The L-shaped members 3 are secured to an annular saddle 5, by nuts 6 located in an annular groove 7 at the inner periphery of the saddle. Hooks 4 are secured to a pair of resilient bands 8 encircling ring 2, as shown in Fig. 1. The curved portions 4ᵃ of the hooks are of greater width than the diameter of the coil-spring, so that the convolutions may expand laterally when subjected to a load. Saddle 5 has oppositely-disposed flanges 5ᵃ to prevent lateral displacement of the ring 2.

The convolutions of ring 2, and the resilient bands 8 are protected from coming into direct contact with the surface of the road by a casing 9 embracing the ring 2, the bands 8, and the saddle 5, said casing being held in place, preferably, by a clamping rim 10 and a removable ring 11, which latter is held in place upon the former by a retaining member 12. Casing 9 also prevents the convolutions of ring 2 from becoming filled with mud or other foreign substance, and acts more or less as a cushion in relieving said ring and the resilient bands 8 from undue shock when contacting with obstacles in the road.

From the foregoing description, it is apparent that I have produced a tire possessing the advantages above enumerated and well adapted for the purpose intended.

Having thus described my invention what I claim, and desire to secure by Letters Patent, is:

In combination with an annular saddle having side flanges, a coil spring formed into a series of convolutions to provide a coil tire spring which seats in said saddle, means to connect the lower end of each convolution to said saddle, a pair of spaced bands on opposite sides of said ring located beyond the peripheral edges of the side flanges of said saddle, a hook carried by each band for each convolution, said hooks having curved portions of greater width than the diameter of the coil spring so as to permit said convolutions to expand laterally, and a casing extending over said bands and the side flanges of the saddle.

In testimony whereof I affix my signature, in the presence of two witnesses.

OSCAR H. DUCKWORTH.

Witnesses:
ROBERT P. SMITH,
FRANK M. BOOKWALTER, Jr.